J. STUNGO.
WHEEL AND DEMOUNTABLE RIM CONSTRUCTION.
APPLICATION FILED APR. 12, 1919.
1,351,587.
Patented Aug. 31, 1920.
2 SHEETS—SHEET 1.
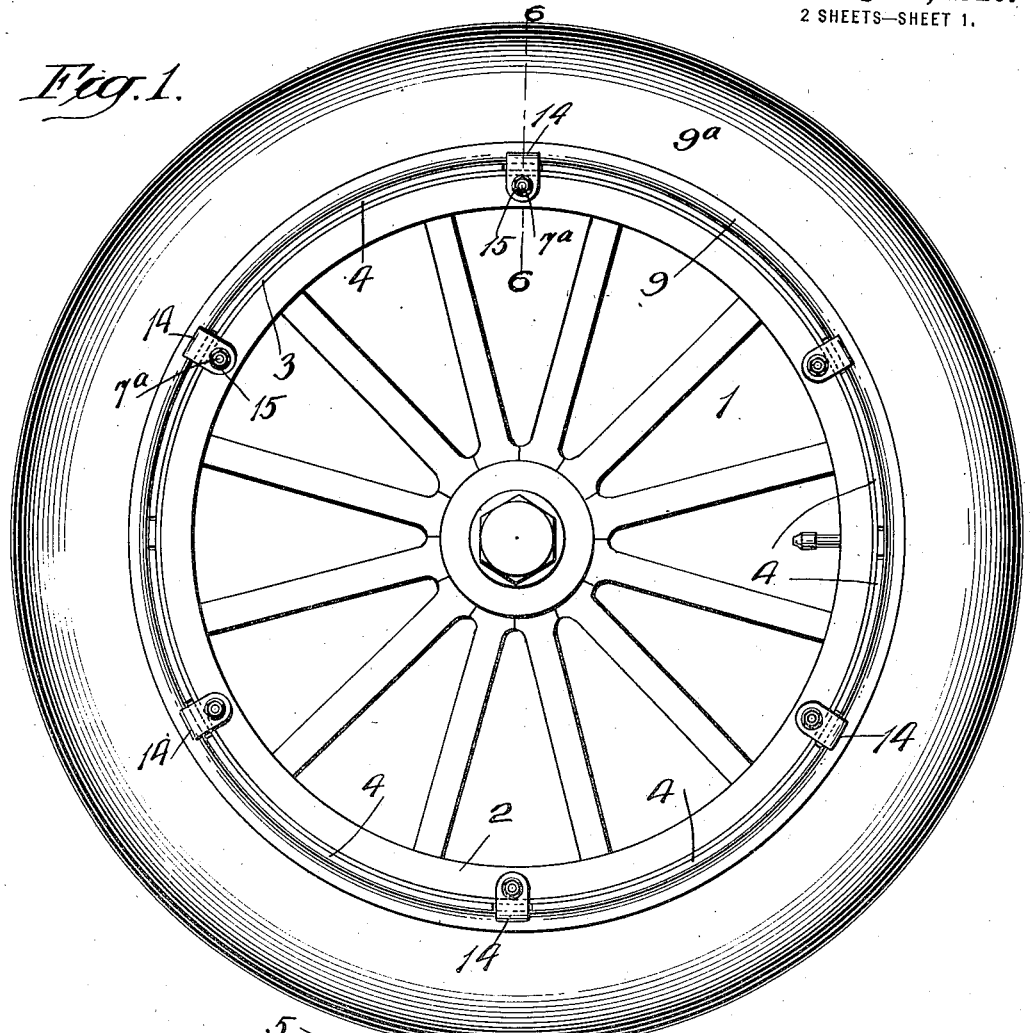
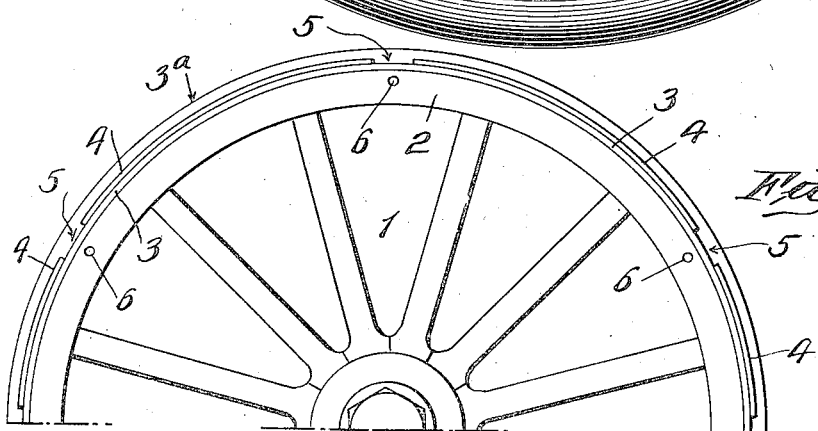

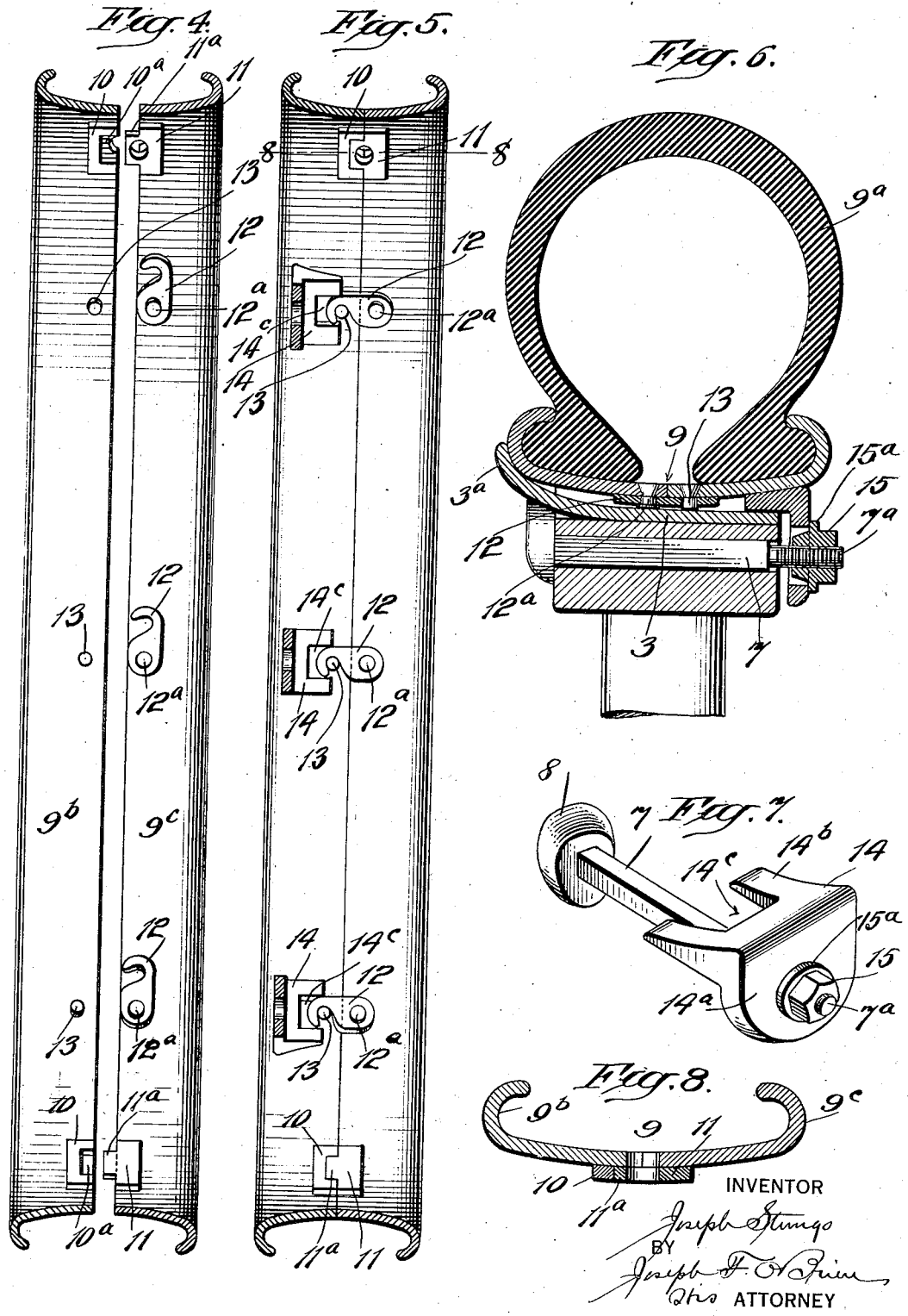

UNITED STATES PATENT OFFICE.

JOSEPH STUNGO, OF NEW YORK, N. Y.

WHEEL AND DEMOUNTABLE-RIM CONSTRUCTION.

1,351,587.  Specification of Letters Patent.  Patented Aug. 31, 1920.

Application filed April 12, 1919. Serial No. 289,723.

*To all whom it may concern:*

Be it known that I, JOSEPH STUNGO, a subject of the King of Great Britain, and a resident of the borough of Manhattan, city, county, and State of New York, have invented new and useful Improvements in Wheels and Demountable - Rim Construction, of which the following is a specification.

This invention relates to improvements in wheels and demountable rim construction.

One object of my invention is to produce a wheel in which a two-part rim comprising two annular bands adapted to be brought into abutment with each other are first provided with inter-engaging alining means for initially alining the parts, has inter-engaging latching means for connecting the said parts together; means for locking the latching means in latched position and means for locking the tire rim to the felly band or felly which carries an additional locking socket for the latching element.

Other objects of my invention will be in part obvious from the annexed drawings and in part indicated in connection therewith by the following analysis of this invention.

This invention accordingly also consists in the features of construction, combinations of parts, and in the unique relationship of the members and in the relative proportioning and disposition thereof, all as more completely outlined in the following specification and in said drawings.

To enable others skilled in the art so fully to comprehend the underlying features of my invention that they may embody the same by numerous modifications in structure and relationship of parts contemplated by this invention, drawings depicting a preferred form, have been annexed as a part of this disclosure, and in such drawings like characters of reference denote corresponding parts throughout all the views, of which:—

Figure 1 is a side elevation of a wheel embodying my invention;

Fig. 2 is a side elevation of a wheel provided with a felly band on which a rim and tire are adapted to be mounted;

Fig. 3 is a plan view of the felly band shown in Fig. 2;

Fig. 4 is a sectional view of a rim showing in side elevation a portion of the inner surface of such rim which embodies initial alining means and latching means of my invention;

Fig. 5 is a similar view showing a portion of the wedging means engaging and locking said latching means in position;

Fig. 6 is a section on the line 6—6 of Fig. 1;

Fig. 7 is a detailed view of the wedging device preferably employed by me; and

Fig. 8 is a section on the line 8—8 of Fig. 5.

Referring now to these drawings, 1 indicates a wheel having a felly 2 on which, as shown, is mounted a felly band 3 having an upwardly extending flange $3^a$ at one side or marginal edge with the opposite side or marginal edge flat and flush with the side of the felly 2. Suitably disposed on this felly band 3 and connected thereto in spaced relation to each other by rivets $4^a$, or in any other suitable manner, are a series of spacing strips 4 so arranged relatively to each other as to leave grooves 5 between the ends of adjacent spacing strips, each of which grooves will form a seat for a latching device as hereinafter explained. A bolt aperture 6 is disposed centrally beneath the grooves 5 through the felly 2, and bolts 7 preferably having square shanks and suitable heads 8 are inserted in the bolt apertures 6 so as to leave a threaded projection $7^a$ extending at the flat and flush side of the felly band 3. A rim 9 which, as shown in Figs. 1 and 6, has a tire $9^a$ mounted thereon, is formed of two longitudinally split parts $9^b$—$9^c$ adapted, when in tire-securing relationship, to abut against each other along the middle of the felly band 3. The opposite parts $9^b$—$9^c$ of this rim are each provided, as shown, with opposite members of a pair of inter-engaging alining devices. Each alining device is composed, as shown, of a socket piece 10, having a socket $10^a$ on one part $9^b$ of the rim and a tongue piece 11 on the opposite rim part $9^c$ having a tongue $11^a$ adapted to fit within the said socket on the opposite part, the said tongue and socket being of such relative conformation that when the rim parts are brought into abutment the seating of the tongues on one part within the sockets on the opposite part will cause an initial alinement of the two parts of the rim. Said rim parts are also provided with a series of latching hooks 12 and studs 13, the hooks 12 preferably being pivoted, as shown at 12ᵃ on one of the parts and being adapted to extend over the split and engage with studs 13 on the opposite part, so as to connect the previously alined parts together and prevent lateral movement therebetween or separation thereof.

The tire rim is subsequently mounted upon and locked on the felly band as hereinafter described, but in order to retain the latching device in initially latched position when the rim is mounted but before locking thereof, I arrange the series of spacing or filler strips 4 in such relationship as to provide a seat or groove 5 between the ends of such strips 4. The walls of this groove or seat 5 will after mounting abut at opposite sides against the pivoted end of the hook of the latching device and lock the same against movement so as to prevent it from disengagement with the stud 13, thus providing an initial locking device for the tire rim parts. After such mounting, the tire rim is locked to the felly band, and in order simultaneously to secure said tire rim in place, and to provide a secondary or double lock for said latching element, I provide a wedge piece 14 having a downwardly extending flange 14ᵃ and an inwardly extending wedging part 14ᵇ having a cut out portion 14ᶜ, the walls of which are adapted to abut against a portion of each of the latching devices. Such a wedge piece is seated in each of the grooves 5 and is forced into wedging relationship with the tire rim by means of a nut 15 on the threaded end 7ᵃ of the bolt 7. In the preferred form of my invention, I employ a hexagon nut 15 having a shoulder 15ᵃ abutting against the outer surface of the flange 14ᵃ and said nut is also preferably provided with an inward projection of truncated-cone conformation which fits within the bolt aperture in the flange 14ᵃ and gives sufficient body to the nut without having the same projecting an excessive distance beyond the felly.

Having described my invention, I claim:

1. The combination with a wheel, of a demountable tire-carrying rim composed of two circumferentially-split parts, releasable means bridging said split parts and connecting the same together, wedging means movable to engage and lock said releasable connecting means against releasing movement and simultaneously to frictionally engage the said rim and wheel to secure the same together and means on the wheel for moving the said wedging means into said locking and frictional engagements.

2. The combination with a wheel, of a demountable tire-carrying rim composed of two circumferentially-split parts, a series of releasable latching devices, one element of which is disposed on one rim part and the other element on the opposite part, a series of wedging elements adapted simultaneously to lock the latching devices against releasing movement and to frictionally engage the said rim and the wheel to secure the same together and means on the wheel for forcing the said wedging means into said locking and frictional engagements.

3. The combination with a wheel, of a demountable tire-carrying rim composed of two circumferentially-split parts, a series of releasable latching devices, one element of which is disposed on one rim part and the other element on the opposite part, a series of wedging elements inserted between the rim and wheel in the plane of said latches and into engagement therewith simultaneously to lock such latching devices against releasing movement and to frictionally secure the rim to the wheel and means on the wheel for forcing the said wedging means into said locking and frictional engagements.

4. The combination with a wheel, of a demountable tire-carrying rim composed of two circumferentially-split parts, a series of releasable latching devices each comprising a pivoted hook having a portion movable over the split between such parts and a coöperating stud, one of which coöperating elements is disposed on one rim part and the other on the opposite part, a series of wedging elements inserted between the rim and wheel in the plane of said hooks and having a seat adapted to embrace one end thereof, and means on the wheel for forcing the said wedging means into said locking and frictional engagements, whereby the insertion of the wedging element will simultaneously lock the rim to the wheel and lock the hooks against releasing pivotal movement.

5. The combination with a wheel, of a rim composed of two circumferentially-split parts, a series of latching devices each comprising a pivoted hook having a portion movable over the split between such parts and a coöperating stud, one element of which is disposed on one rim part and the other element on the opposite part, a series of wedging elements each adapted to be inserted in the plane of said latching elements to frictionally lock the rim to the wheel and having a cut out portion adapted simultaneously with said frictional locking to embrace the sides of a latching hook and prevent a releasing pivotal movement thereof and a series of stationary spacing strips secured to the felly band and adapted upon mounting of the rim to guide the wedging elements into position and prevent creeping thereof.

In witness whereof, I have signed my name to the foregoing specification in the presence of two subscribing witnesses.

JOSEPH STUNGO.

Witnesses:
  HELEN V. WHIDDEN,
  STALLO VINTON.